United States Patent
Kia et al.

(10) Patent No.: US 10,612,163 B2
(45) Date of Patent: Apr. 7, 2020

(54) MODIFICATION OF CONTINUOUS CARBON FIBERS DURING PRECURSOR FORMATION FOR COMPOSITES HAVING ENHANCED MOLDABILITY

(71) Applicant: GM Global Technology Operations LLC, Detroit, MI (US)

(72) Inventors: Hamid G. Kia, Bloomfield Hills, MI (US); Selina X. Zhao, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 246 days.

(21) Appl. No.: 15/685,157

(22) Filed: Aug. 24, 2017

(65) Prior Publication Data
US 2019/0062955 A1    Feb. 28, 2019

(51) Int. Cl.
*D01F 9/22*    (2006.01)
*D01D 5/18*    (2006.01)
(Continued)

(52) U.S. Cl.
CPC ............... *D01F 9/22* (2013.01); *C08J 5/042* (2013.01); *D01D 5/18* (2013.01); *D01D 10/02* (2013.01);
(Continued)

(58) Field of Classification Search
None
See application file for complete search history.

(56) References Cited

U.S. PATENT DOCUMENTS

| 3,458,615 A | 7/1969 | Bragaw, Jr. et al. |
| 3,699,210 A | 10/1972 | Binning et al. |

(Continued)

FOREIGN PATENT DOCUMENTS

| CN | 101600550 A | 12/2009 |
| CN | 102965928 A | 3/2013 |

(Continued)

OTHER PUBLICATIONS

Hamid G. Kia et al.; U.S. Appl. No. 15/836,315, filed Dec. 8, 2017 entitled "Equipment for Perforated Pre-Impregnated Reinforcement Materials"; 54 pages.

(Continued)

*Primary Examiner* — Shawn Mckinnon
(74) *Attorney, Agent, or Firm* — Harness, Dickey & Pierce, P.L.C.

(57) ABSTRACT

Methods of producing a continuous carbon fiber for use in composites having enhanced moldability are provided. A continuous precursor fiber is formed that has a sheath and a core. The sheath includes a first polymer material. The core includes a second polymer material and a plurality of discrete regions distributed within the second polymer material. The discrete regions include a third polymer material. After the continuous precursor fiber is heated for carbonization and graphitization, the continuous precursor fiber forms a continuous carbon fiber having a plurality of discrete weak regions corresponding to the plurality of discrete regions in the core. Carbon fiber composites made from such modified continuous carbon fibers having enhanced moldability are also provided.

14 Claims, 3 Drawing Sheets

(51) Int. Cl.
    *D01F 6/54*     (2006.01)
    *D01D 10/02*     (2006.01)
    *C08J 5/04*     (2006.01)
    *D01F 9/14*     (2006.01)
    *D01F 1/10*     (2006.01)
    *D01F 8/18*     (2006.01)

(52) U.S. Cl.
    CPC .................. *D01F 1/10* (2013.01); *D01F 6/54* (2013.01); *D01F 8/18* (2013.01); *D01F 9/14* (2013.01)

(56) References Cited

U.S. PATENT DOCUMENTS

| | | | |
|---|---|---|---|
| 4,208,267 | A | 6/1980 | Diefendorf et al. |
| 5,017,423 | A | 5/1991 | Bossmann et al. |
| 5,024,818 | A | 6/1991 | Tibbetts et al. |
| 5,194,212 | A | 3/1993 | Bonnett |
| 5,582,912 | A | 12/1996 | McCullough, Jr. et al. |
| 5,916,346 | A | 6/1999 | Neal |
| 6,638,883 | B2 | 10/2003 | Gaffney et al. |
| 8,191,215 | B2 | 6/2012 | Meyer |
| 8,309,644 | B1 | 11/2012 | Huang |
| 8,567,469 | B2 | 10/2013 | Meyer et al. |
| 8,568,549 | B2 | 10/2013 | Meyer et al. |
| 9,896,783 | B2 | 2/2018 | Kia |
| 9,920,454 | B2 | 3/2018 | Sutti et al. |
| 9,956,712 | B2 | 5/2018 | Lanzl et al. |
| 10,113,250 | B2 | 10/2018 | Kia |
| 10,358,767 | B2 | 7/2019 | Kia et al. |
| 2003/0100239 | A1 | 5/2003 | Gaffney et al. |
| 2004/0089129 | A1 | 5/2004 | Toth |
| 2010/0028593 | A1 | 2/2010 | Taketa et al. |
| 2012/0213997 | A1 | 8/2012 | Wang et al. |
| 2013/0149523 | A1* | 6/2013 | Tsotsis ............ D01D 5/24 428/297.4 |
| 2014/0264985 | A1 | 9/2014 | Sutti et al. |
| 2016/0194468 | A1 | 7/2016 | Ogasawara et al. |
| 2017/0067185 | A1* | 3/2017 | Kia ................ D01F 9/22 |
| 2017/0067186 | A1 | 3/2017 | Kia |
| 2017/0314668 | A1 | 11/2017 | Kia et al. |
| 2018/0016740 | A1 | 1/2018 | Kia et al. |
| 2018/0085991 | A1 | 3/2018 | Kia et al. |
| 2019/0177893 | A1 | 6/2019 | Kia et al. |

FOREIGN PATENT DOCUMENTS

| | | |
|---|---|---|
| CN | 104024494 A | 9/2014 |
| CN | 104441678 A | 3/2015 |
| CN | 105793019 A | 7/2016 |
| CN | 106521716 A | 3/2017 |
| CN | 106521718 A | 3/2017 |
| CN | 107618194 A | 1/2018 |
| CN | 107866985 A | 4/2018 |
| CN | 109423703 A | 3/2019 |
| DE | 3540411 A1 | 5/1987 |
| DE | 19944164 A1 | 6/2000 |
| DE | 102007012607 A1 | 9/2008 |
| DE | 102007012609 A1 | 9/2008 |
| DE | 102007012608 A1 | 10/2008 |
| DE | 102016116053 A1 | 3/2017 |
| DE | 102016116662 A1 | 3/2017 |
| DE | 102017115451 A1 | 1/2018 |
| DE | 102017121837 A1 | 3/2018 |
| DE | 102018120626 A1 | 2/2019 |
| EP | 2127840 A1 | 12/2009 |
| EP | 1305268 B1 | 9/2010 |
| EP | 2679619 A1 | 1/2014 |
| EP | 2862971 A1 | 4/2015 |
| GB | 2373793 A | 10/2002 |
| JP | 2001-73230 A | 3/2001 |
| JP | 2004345154 A | 12/2004 |
| JP | 2013082229 A | 5/2013 |
| WO | WO-2014100127 A1 | 6/2014 |

OTHER PUBLICATIONS

First Office Action for German Patent Application No. 102017115451.5 dated May 18, 2018 and correspondence dated May 28, 2018 from Manitz, Finsterwald & Partner summarizing contents; 5 pages.

First Office Action for Chinese Patent Application No. 201610771305.1 dated Jun. 12, 2018 with English language machine translation, 9 pages.

First Office Action for Chinese Patent Application No. 201610743811.X dated Jun. 21, 2018 with English language machine translation, 9 pages.

First Office Action for German Patent Application No. 102017121837.8 dated Oct. 4, 2018 and correspondence dated Oct. 17, 2018 from Manitz, Finsterwald & Partner summarizing contents; 6 pages.

Polyacrylonitrile (PAN) Carbon Fibers Industrial Capability Assessment, OUSD (AT&L) Industrial Policy, U.S. Department of Defense (Oct. 2005); 23 pages.

Technical Data Sheet, "Polyacrylonitrile (PAN): how is it made?", Toray Carbon Fibers Europe, downloaded from http://www.toray-cfe.com/index.php/en/newsletter-v2/42-product/48-polyacrylonitrile-pan-how-is-it made, (published on or before Aug. 14, 2015); 2 pages.

Park, Soon-Jin, et al., "Precursors and Manufacturing of Carbon Fibers," Springer Series in Materials Science, vol. 210 (Oct. 9, 2014); pp. 31-66.

Cytec Industries Inc.; Safety Data Sheet for VTM® 264 Prepreg; Aug. 5, 2013; 9 pages.

Cytec Industrial Materials; VTM® 264-1 & VTM® 264S-1; PDS1268_07.13_Issue1a; Jul. 17, 2013; 3 pages.

First Office Action for German Application No. 102016116662.6 dated Aug. 30, 2017; 6 pages.

First Office Action for German Application No. 102016116053.09 dated Aug. 29, 2017; 5 pages.

Hamid G. Kia et al.; U.S. Appl. No. 15/211,814, filed Jul. 15, 2016 entitled "Carbon Fiber Pre-Pregs and Methods for Manufacturing Thereof"; 44 pages.

Hamid G. Kia et al.; U.S. Appl. No. 15/141,361, filed Apr. 28, 2016 entitled "Linear Expansion Reduction of Metal Component Assemblies Using Composites"; 41 pages.

First Office Action for Chinese Patent Application No. 201710492904.4 dated Jan. 18, 2019 with correspondence dated Feb. 11, 2019 from China Patent Agent H.K. Ltd. summarizing contents, 9 pages.

("Hollow." Merriam Webster, www.merriam-webster.com/dictionary/hollow (2018).

First Office Action for Chinese Patent Application No. 201710846713.3 dated Jun. 27, 2019 with correspondence dated Jul. 2, 2019 from China Patent Agent (H.K.) Ltd. summarizing contents, 8 pages.

* cited by examiner

MODIFICATION OF CONTINUOUS CARBON FIBERS DURING PRECURSOR FORMATION FOR COMPOSITES HAVING ENHANCED MOLDABILITY

GOVERNMENT SUPPORT

This invention was made with government support under Defense Advanced Research Projects Agency (DARPA) Grant No. HR0011-C-16-2-0048 awarded by the U.S. Department of Defense. The Government has certain rights in the invention.

INTRODUCTION

This section provides background information related to the present disclosure which is not necessarily prior art.

The present disclosure relates to methods of modifying continuous carbon fibers during precursor formation to form high strength composites having enhanced moldability.

Carbon fibers are used as a light-weight reinforcement phase to make high-strength light-weight polymeric composite materials. Carbon fibers can be produced by carbonizing or graphitizing carbon fiber precursor material fibers. Carbon fiber precursors may be formed from polyacrylonitrile (PAN), petroleum pitch, or rayon precursors, by way of example. Carbon fibers and graphite fibers are made and heat-treated at different temperatures and thus each has different carbon content. Typically, a carbon fiber is considered to be a fiber that has at least about 90% by weight carbon.

Composites incorporating carbon fibers are light-weight and high-strength. Composites incorporating continuous carbon fiber filaments have particularly high strength (e.g., ultrahigh strength) as compared to composites incorporating chopped or milled carbon fibers. While ultrahigh strength composites are highly desirable in certain applications, lack of flowability and formability has been a challenge to using continuous carbon fibers in composites. For example, composite pre-pregs incorporating continuous carbon fibers can be too stiff and thus have high resistance to flow. Such inflexibility and rigidity translates to poor moldability, making it difficult to form three-dimensional shapes from composites having continuous carbon fibers. It would be desirable to form continuous carbon fiber composites having greater flexibility, higher flowability, and thus greater moldability with the capability of readily forming complex and three-dimensionally shaped components with ultrahigh-strengths.

SUMMARY

This section provides a general summary of the disclosure, and is not a comprehensive disclosure of its full scope or all of its features.

In certain aspects, the present disclosure provides a method of producing a continuous carbon fiber for use in composites having enhanced moldability. The method may include forming a continuous precursor fiber including a sheath and a core. The sheath includes a first polymer material and the core includes a second polymer material and a plurality of discrete regions distributed within the second polymer material. The plurality of discrete regions includes a third polymer material. After the continuous precursor fiber is heated for carbonization and graphitization, the continuous precursor fiber forms a continuous carbon fiber having a plurality of discrete weak regions corresponding to the plurality of discrete regions in the core. The continuous carbon fiber remains substantially intact until a molding process to form a carbon fiber composite.

In one aspect, the forming includes extruding a first polymer material in a first extruder to form the sheath and co-extruding the second polymer material and the third polymer material in a second extruder to form the core having a plurality of discrete regions of the third polymer material distributed within the second polymer material.

In one aspect, after the extruding and co-extruding, the method further includes introducing the first polymer material, the second polymer material, and the third polymer material through a nozzle or spinneret to form the continuous precursor fiber including the sheath and the core.

In one aspect, the third polymer material is selected from the group consisting of: lignin, polyethylene, polystyrene, polyacrylonitrile (PAN), polymers including submicron filler particles, and combinations thereof.

In one aspect, the first polymer material and the second polymer material have the same composition.

In one aspect, the first polymer material and the second polymer material are an acrylic copolymer formed from an acrylonitrile monomer and a second monomer selected from the group consisting of: acrylic acid, itaconic acid, methacrylic acid, vinyl esters, vinyl amides, vinyl halides, salts of vinyl compounds, salts of sulfonic acids, and combinations thereof.

In one aspect, the plurality of discrete weak regions has a first ultimate tensile strength that is at least 50% less than a second ultimate tensile strength of a remainder of the continuous carbon fiber.

In one aspect, a ratio of second polymer material to third polymer material in the core of the continuous precursor fiber ranges from greater than or equal to about 2 to less than or equal to about 300.

In one aspect, each respective discrete weak region of the plurality of discrete weak regions has a length of less than or equal to about 2 inches.

In one aspect, each respective discrete weak region of the plurality of discrete weak regions is spaced apart from an adjacent weak region in the core of the continuous carbon fiber by a distance of greater than or equal to about 0.1 inches to less than or equal to about 12 inches.

In one aspect, the sheath has an average wall thickness of greater than or equal to about 0.5 μm to less than or equal to about 3 μm and the core has an average diameter of greater than or equal to about 1 μm to less than or equal to about 7 μm.

In certain other aspects, the present disclosure provides a method of producing a bundle of continuous carbon fibers for use in composites having enhanced moldability. The method includes forming a plurality of continuous precursor fibers each including a sheath and a core. The sheath includes a first polymer material and the core includes a second polymer material and a plurality of discrete regions distributed within the second polymer material. The plurality of discrete regions includes a third polymer material. After the plurality of continuous precursor fibers is heated for carbonization and graphitization, the plurality of continuous precursor fibers forms the bundle of continuous carbon fibers. Each fiber has a plurality of discrete weak regions corresponding to the plurality of discrete regions in the core and the bundle of continuous carbon fibers remain substantially intact until a molding process to form a carbon fiber composite.

In one aspect, the plurality of continuous precursor fibers includes a first continuous carbon fiber having a first plurality of discrete weak regions in a first core and an adjacent second continuous carbon fiber having a second plurality of discrete weak regions in a second core. The first plurality of discrete weak regions is staggered with respect to the second plurality of discrete weak regions when the first continuous carbon fiber and the adjacent second continuous carbon fiber are aligned lengthwise.

In one aspect, the method further includes heating the plurality of continuous precursor fibers to a temperature of greater than or equal to about 1,500° C. for carbonization and/or graphitization.

In one aspect, the method further includes heating the plurality of continuous precursor fibers to a temperature of greater than or equal to about 200° C. to less than or equal to about 300° C. for thermal stabilization prior to the heating for carbonization and/or graphitization.

In certain aspects, the present disclosure provides a carbon fiber composite having enhanced moldability including a polymeric matrix. The polymeric matrix incorporates one or more continuous carbon fibers having a length of greater than or equal to about 2 inches. The one or more continuous carbon fibers include a plurality of discrete weak regions in a core. The plurality of discrete weak regions has a first ultimate tensile strength that is at least 50% less than a second ultimate tensile strength of a remainder of the one or more continuous carbon fibers and carbon fiber composite has an ultimate tensile strength of greater than or equal to about 500 MPa.

In one aspect, the first ultimate tensile strength of greater than or equal to about 1,500 MPa.

In one aspect, each respective discrete weak region of the plurality of discrete weak regions is spaced apart from an adjacent discrete weak region in the core of the continuous carbon fiber by a distance of greater than or equal to about 0.1 inches to less than or equal to about 12 inches.

In one aspect, the carbon fiber composite forms an automotive structural component selected from the group consisting of: a hood, a pillar, a panel, a structural panel, a door panel, a door component, an interior floor, a floor pan, a roof, an exterior surface, an underbody shield, a wheel component, a storage area, a glove box, a console box, a trunk, a trunk floor, a truck bed, a lamp pocket, a shock tower cap, a control arm, a suspension component, a crush can, a bumper, a structural rail, a structural frame, a cross car beam, an undercarriage component, a drive train component, and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
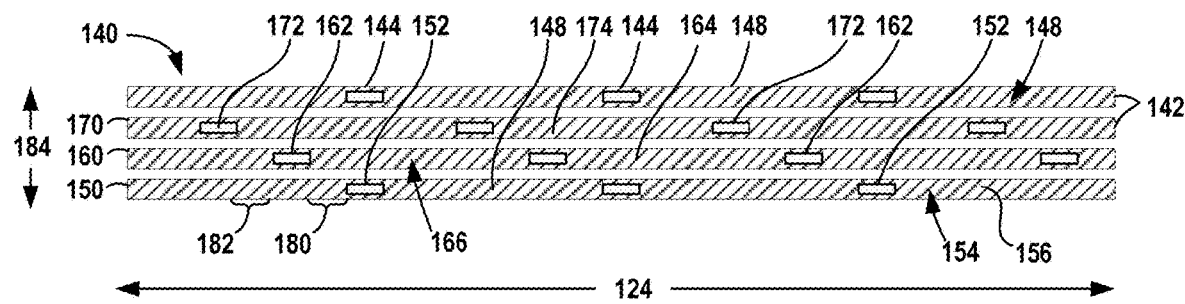

FIG. 5 is a schematic of a bundle of a plurality of continuous carbon fiber filaments prepared in accordance with certain aspects of the present disclosure. Each respective continuous carbon fiber filament core region has a plurality of discrete, noncontiguous, weak regions interspersed therein. The discrete weak regions are staggered and offset as compared to weak regions in the adjacent carbon fiber filaments.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Polymeric composites incorporating carbon fibers are high-strength and light-weight. However, it can be difficult to make complex three-dimensional shaped components from carbon-fiber reinforced polymeric composites (CFRP), especially where the carbon fibers are continuous fibers. Carbon-fiber reinforced polymeric composites (CFRP) comprise a resin that is cured and/or solidified to form a polymeric matrix having a plurality of carbon fibers distributed therein as a reinforcement phase.

Carbon fibers may be continuous filaments that may be thousands of micrometers (μm) or millimeters (mm) in length. A group of continuous carbon fibers is often categorized as a bundle of continuous carbon fiber filaments. Carbon fiber "tow" is usually designated as a number of filaments in thousands (designated by K after the respective tow number). Alternatively, carbon fiber bundles may be chopped or milled and thus form short segments of carbon fibers (filaments or bundles) typically having a mean fiber length between 50 μm and 50 mm (about 1.97 inches).

In various aspects, the present disclosure pertains to use of continuous carbon fibers, which in certain aspects have a length of greater than or equal to about 2 inches, as compared to chopped or milled carbon fibers. In certain aspects, a continuous carbon fiber has a length of greater than or equal to about 2 inches, optionally greater than or equal to about 3 inches, optionally greater than or equal to about 4 inches, optionally greater than or equal to about 5 inches, optionally greater than or equal to about 6 inches, optionally greater than or equal to about 7 inches, optionally greater than or equal to about 8 inches, optionally greater than or equal to about 9 inches, optionally greater than or equal to about 10 inches, optionally greater than or equal to about 11 inches, and in certain variations, optionally greater than or equal to about 12 inches (or 1 foot).

CFRPs are often created from a pre-preg, where the carbon fibers are initially impregnated with uncured or partially cured resin. A component or part can be formed by using the pre-preg to be laid-up on a mandrel or mold, where it is then consolidated and cured to form the final component. As noted above, while all CFRPs are light-weight and high-strength, composites incorporating continuous carbon fiber filaments have especially high strength as compared to composites filled with chopped or milled carbon fibers. By way of non-limiting example, a representative unidirectional continuous carbon fiber filament when incorporated into a composite has an ultrahigh ultimate tensile strength of about 1,500 to 2,000 MPa, while chopped carbon fibers have an ultimate tensile strength of about 200 MPa to 500 MPa.

In various aspects, the present disclosure provides methods for improving moldability of composites having carbon fibers as a reinforcment phase. As noted above, while polymeric composites incorporating continuous carbon fibers are high-strength and light-weight, they are typically difficult to make into complex three-dimensional shaped components. Without further manipulation, such continuous carbon fiber polymeric composites are not readily made into contoured or three-dimensionally shaped parts with complex three dimensional profiles.

Several techniques are currently used to form complex shaped parts from continuous carbon fiber composites, but these can suffer from certain drawbacks. The first technique incorporates continuous carbon fibers into a composite sheet having continuous unidirectional carbon fibers, but then divides the larger composite sheet into multiple smaller pieces (either as a pre-preg or just before application to form the component). The smaller cut pieces are then assembled so that the edges of adjacent pieces overlap in a manual layup process to create a larger structure. The smaller pieces thus have hundreds of thousands of continuous carbon fiber filaments (e.g., cut bundles) that terminate on the same cut line(s). While the smaller pieces can be laid up to create more complex shapes and contours, this technique has the disadvantage of reducing strength of the part because the unidirectional carbon fiber filaments all end along the same cut line. Even though the cut pieces overlap, there remain various loci or regions for stress propagation and fracture throughout the composite along the cut lines that reduces overall strength.

Alternatively, in another technique, the carbon fiber bundles may be chopped or milled into shorter fiber segments, typically with a maximum length of less than about 2 inches. Each bundle may have approximately 50,000 filaments (e.g., 50K tow), by way of example. Typically the chopped fibers are distributed in a single orientation homogenously within the composite as an anisotropic reinforcement phase. However, the short chopped fibers are discontinuous and provide open regions between distinct fibers for stress and crack propagation through the resin/polymeric matrix. While still providing high strengths, chopped carbon fiber composites typically have lower strengths than continuous carbon fiber composites, often an order of magnitude less.

In yet another technique, a distinct material that is weaker than a base precursor polymer material may be intermittently incorporated as discrete regions into a carbon fiber. However, this approach raises other technical challenges, as the weaker material introduced into the fiber precursor needs to have similar stress-strain properties as the precursor polymer material through a range of temperatures. The need to match the properties of the weaker impurity material and the main precursor material limits the weaker impurity materials that are possible. After formation, the precursor fiber having discrete weak regions corresponding to the weaker material ideally remains substantially intact through processing and transferring/transport, including through carbonization and graphitization processes, so that a majority of breakage only occurs during the molding process. By substantially intact, it is meant that less than or equal to about 10% of the continuous carbon fibers prepared in accordance with the present disclosure break prior to molding, optionally less than or equal to about 5%, optionally less than or equal to about 4%, optionally less than or equal to about 3%, optionally less than or equal to about 2%, and in certain variations, optionally less than or equal to about 1% of the continuous carbon fibers break prior to molding. In this manner, the intact carbon fiber will desirably break during molding of a three-dimensional component of composite material in a mold cavity to enhance moldability and flexibility. However, when using a traditional precursor fiber having discrete regions of a weaker material interspersed in the main precursor material in a continuous fiber, potential fragility of the carbon fiber precursor or carbon fibers can result in undesired premature breakage prior to the molding process. This can occur during processing, because the precursor and carbon fibers are stretched, passed over rollers, and subjected to stress and tension that can result in an undesirably high rate of breakage prior to molding.

In accordance with the present disclosure, composites comprising continuous carbon fibers are provided that retain high strength levels, but have improved moldability and reduced stiffness as compared to conventional continuous carbon fiber composites. Furthermore, the continuous carbon fibers are not unduly fragile or susceptible to potential premature breakage during carbon fiber preparation and processing. Thus, the present disclosure pertains to forming a polymer based carbon fiber precursor that is transformed into a carbon fiber filament. Such methods produce a continuous carbon fiber for use in composites having enhanced moldability. A continuous precursor fiber is formed that comprises a sheath and a core. The sheath comprises a first polymer material. The core comprises a second polymer material and a plurality of discrete regions distributed within the second polymer material.

The plurality of discrete regions comprises a third polymer material. The first and second polymer materials may be traditional carbon fiber precursor materials and may be the same composition or different from one another, as will be discussed below. In certain aspects, the first polymer material and the second polymer material are the same. The third polymer material is distinct from the second polymer material and the third polymer material. The method involves introducing a distinct material (the third polymer material) into a core of the carbon fiber precursor to intentionally create discrete weak regions that are more easily broken and permit breaking points.

Thus, one or more monomers are polymerized to form a polymer material. In certain variations, the first and/or second polymer material comprises an acrylic polymer material. In certain aspects, the first and/or second polymer material is formed from an acrylonitrile monomer and thus may be an polyacrylonitrile (PAN) polymer. In carbon fiber precursor formation, one of more co-monomers may be polymerized with the acrylonitrile monomer. The acrylic polymer material may be a copolymer formed from an acrylonitrile monomer and a second monomer selected from the group consisting of: acrylic acid, itaconic acid, methacrylic acid, vinyl esters, such as methyl acrylate, ethyl acrylate, butyl acrylate, methyl methacrylate, vinyl acetate, and the like, vinyl amides, such as acrylamide, diacetone acrylamide, and the like, vinyl halides, such as allyl chloride, vinyl bromide, vinyl chloride, and the like, salts of vinyl compounds, such as quaternary ammonium salt of aminoethyl-2-mehtylpropeneoate, salts of sulfonic acids, such as sodium vinyl sulfonate, sodium p-styrene sulfonate, and the like, and combinations thereof. The most frequently used co-monomers include itaconic acid, methacrylic acid, acrylic acid, and/or acrylamide polymerized with acrylonitrile.

The third polymeric material has a composition distinct from both the first and second polymer material. A distinct composition is one that exhibits different properties (e.g., strength or brittleness) and may have a distinct chemistry with at least one different compound or may have the same compounds, but a distinct molecular weight, for example. The third polymer material is selected to be a material that has a lower strength than the first and/or second polymer material after being processed and heated to form the carbon fiber, for example, having a lower strength than acrylic polymer material. In certain variations, the third polymeric material is selected from the group consisting of: lignin, polyethylene, polystyrene, polymers comprising fillers having an average particle size of less than about 1 μm ("submicron" sized particles), and combinations thereof. Notably, introduction of the submicron sized particles can introduce weakness into the polymer as compared to an acrylic polymer material alone. In certain variations, the third distinct material comprises lignin. In other variations, the third polymer may be an acrylic polymer or acrylic co-polymer material like those described above in the context of the first and/or second polymer material, but having a different (e.g., smaller) molecular weight that results in a much weaker domain. The domains of the third distinct polymer material thus form the discrete regions within the core of the precursor fiber that eventually are processed to form the discrete weak regions within the carbon fiber.

Figure 1:
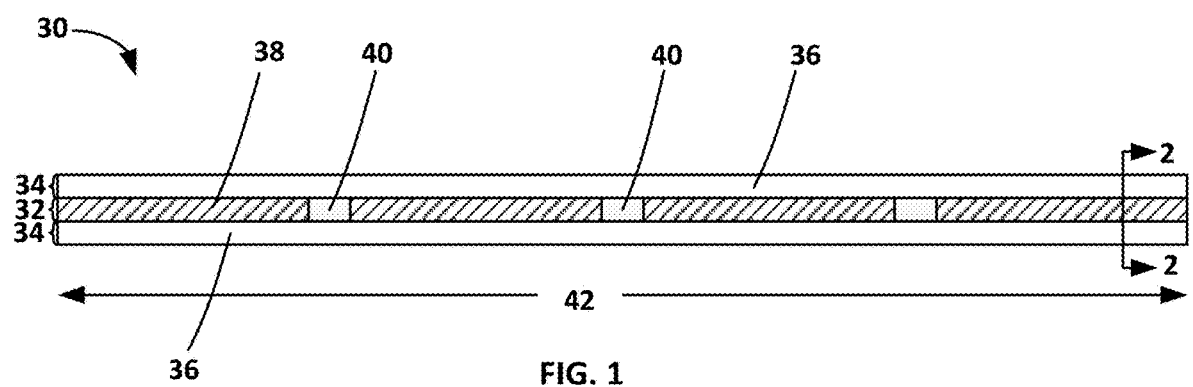
FIG. 1 shows an exemplary continuous carbon fiber precursor having a core and sheath/shell configuration prepared in accordance with certain aspects of the present disclosure.
Figure 2:
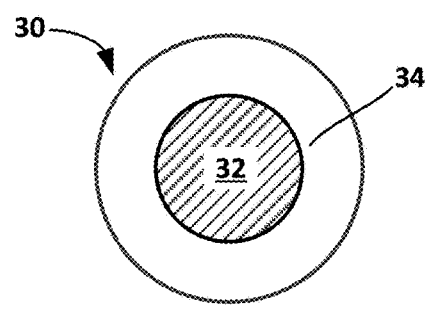
FIG. 2 shows a cross sectional view of the continuous carbon fiber precursor in FIG. 1.

FIGS. 1 and 2 show an exemplary continuous carbon fiber 30 prepared in accordance with certain aspects of the present disclosure. In FIG. 1, the continuous carbon fiber 30 includes a core region 32 and a sheath region 34. The sheath is formed of a first polymer material 36. The core region 32 has a second polymer material 38 with a plurality of discrete weak regions 40 formed of the third polymer material distributed along a length 42 of the core 32/continuous carbon fiber 30. Thus, the carbon fiber 30 includes high strength body regions, including the first polymer material 36 and the second polymer material 38. The plurality of weak regions 40 is dispersed and distributed within the high strength regions of the core. In certain aspects, a weak region 40 is intended to mean a region that preferentially fractures or breaks when stress is applied as compared to the remainder of the body of the carbon fiber 30 including the first polymer material 36 and the second polymer material 38.

In certain aspects, a weak region may be understood to have a strength (e.g., an ultimate tensile strength) that is at least about 50% less than a comparative ultimate tensile strength of a remainder of the continuous carbon fiber, optionally at least about 60%, optionally at least about 70%, optionally at least about 80%, and in certain aspects, optionally at least about 90% less than a comparative strength of the high strength regions of the remainder of the body of the carbon fiber. In one example, the continuous fiber (the sheath and the second polymer material in the core) is PAN-based and has a tensile strength of 5,000 MPa, whereas the weak region is lignin-based and has a tensile strength of 100 MPa. The weak region comprising lignin has about 98% less strength than the strong PAN-based regions. Introduction of these weak domains or regions in accordance with certain aspects of the present disclosure enables formation of carbon-fiber polymeric composites having high strength and low resistivity to flow, thus being more malleable and moldable.

After forming the continuous precursor fiber having a sheath and a core with the plurality of weak regions, the continuous precursor fiber is heated for carbonization and graphitization. In this manner, the continuous precursor fiber forms a continuous carbon fiber having a plurality of discrete weak regions corresponding to the plurality of discrete regions in the core. The weak regions are formed at discrete and regular intervals along the length of each core of each carbon fiber. However, the presence of the sheath around the core helps to maintain structural integrity of the precursor and carbon fiber during manufacturing and processing. The presence of the continuous sheath enables easy processing of the carbon fibers under tension without the risk of fiber breakage. A bundle of a plurality of such continuous carbon fiber filaments having the discrete weak regions within a core region is also contemplated. As will be discussed further herein, the discrete weak regions are preferably staggered with respect to adjacent continuous carbon fiber filaments.

After initial polymerization to form the first, second, and third polymer materials, the polymer materials may be combined together to form a plurality of continuous precursor fibers or filaments. In certain aspects, the polymer materials may be combined with one or more carriers or solvents to enhance transport and processing during precursor formation.

Figure 3:
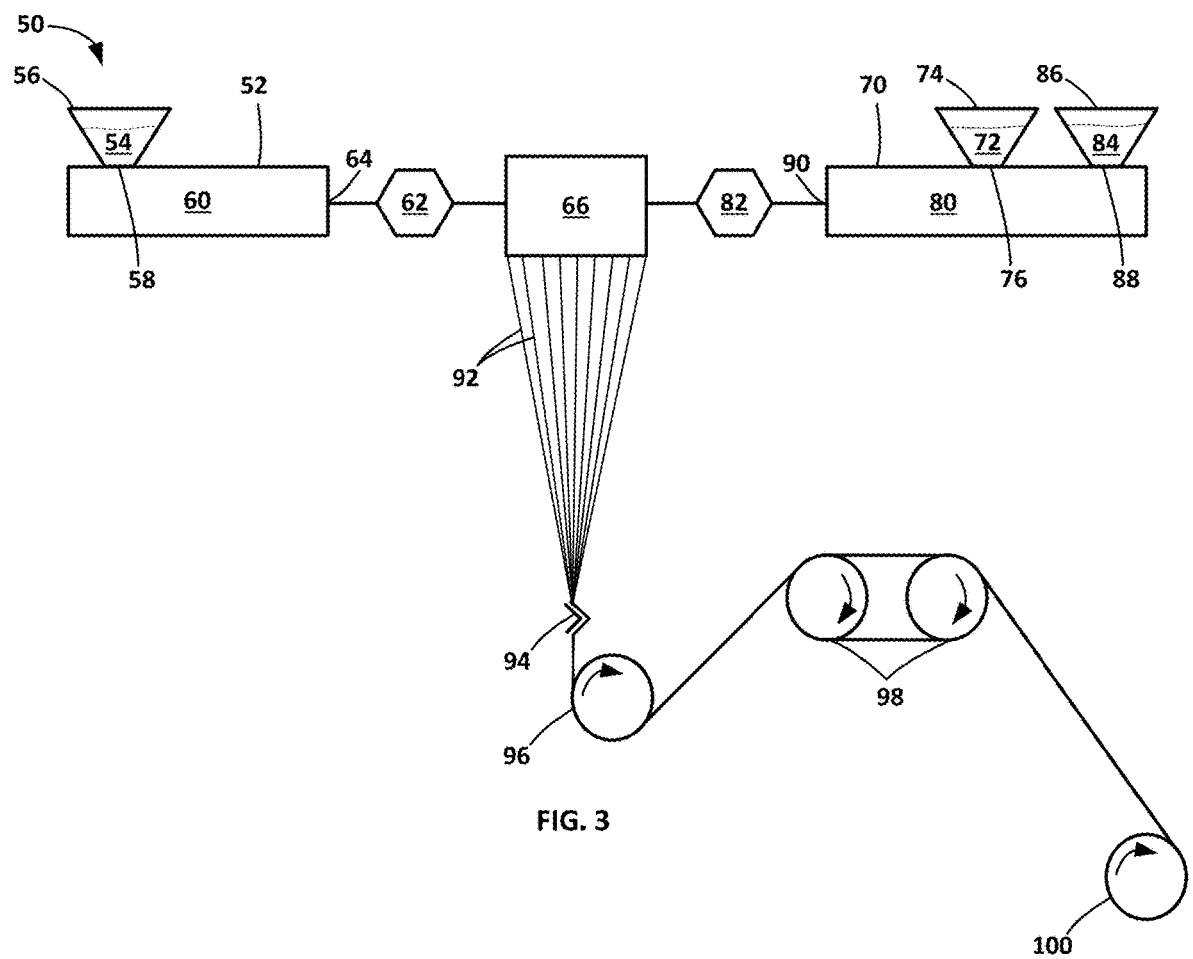
FIG. 3 shows a system for forming an exemplary continuous carbon fiber precursor having a core and sheath configuration according to certain methods of the present disclosure.

FIG. 3 shows an exemplary system 50 for forming a continuous carbon fiber precursor having a core and sheath configuration (where the core has a plurality of discrete weak regions) according to certain methods of the present disclosure. A first extruder 52 receives a first polymer material 54 via a first feed component 56 (e.g., a hopper). The first feed component 56 is connected to an inlet 58 that opens to a first extruder chamber 60, allowing the first polymer material 54 to enter the first extruder chamber 60. The extruder chamber 60 may include various equipment that is not shown in FIG. 3, such as a paddle, impeller, or other rotary component to facilitate movement of the first polymer material 54 along a length of the extruder chamber 60. A first pump 62, such as a gear pump, can also facilitate movement of the first polymer material 54 through the extruder chamber 60. After passing through the extruder chamber 60, the first polymer material 54 passes through exit 64, into first pump 62, and then into a spin pack or spinneret 66.

A second extruder 70 receives a second polymer material 72 via a second feed component 74 (e.g., a hopper). The second feed component 74 is connected to a second inlet 76 that opens to a second extruder chamber 80, allowing the second polymer material 72 to enter the second extruder chamber 80. The second extruder chamber may have similar components and design to the first extruder chamber 60. A third polymer material 84 is fed to the second extruder chamber 80 via a third feed component 86 (e.g., a hopper). The third feed component 86 is connected to a third inlet 88 that opens to a second extruder chamber 80. A second pump 82, such as a gear pump, facilitates movement of the second polymer material 72 and/or third polymer material 84 through the second extruder chamber 80. The second extruder chamber 80 includes a second exit 90. Thus, either the second polymer material 72 or the third polymer material 84 passes through second exit 90, into second pump 82, and then into the spin pack or spinneret 66. In this manner, the second polymer material 72 and the third polymer material 84 are co-extruded together. Notably, the second polymer material 72 and third polymer material 84 may be fed intermittently into and controlled within the second extruder chamber 80, so that a plurality of discrete regions of the third polymer material 84 are interspersed within a stream of the second polymer material 72. Thus, the precursor stream exiting the second extruder chamber 80 may have a plurality of weak regions corresponding to the third polymer material regions in the stream.

The first polymer material 54 exiting the first extruder 52 will form the sheath on each respective fiber or filament, while the precursor stream leaving the second extruder 70 having the plurality of discrete regions of the third polymer material 84 interspersed within the second polymer material 72 will form a core in each respective fiber or filament. The spinneret 66 is configured to form a core and sheath configuration in each precursor fiber and thus serves to distribute the first polymer material extruded from the first extruder as a shell/sheath and the precursor stream with the second polymer material and the third polymer material from the second extruder as the core in each fiber. While not shown, the spinneret 66 may include internal conduits connected to various apertures or outlets. One feed conduit may thus introduce the first polymer material around an individual aperture to define an external shell or sheath as it passes through the aperture, while another internal coaxial feed conduit may feed the precursor stream having the third polymer material 84 interspersed within the second polymer material 72 to form an internal core as it passes through the aperture. By way of non-limiting example, a suitable spinneret for forming a core and sheath filament is described in U.S. Pat. No. 3,459,615 to Bragaw, Jr., et al., the relevant portions of which are incorporated herein. A plurality of apertures and feed conduits may be used to form multiple precursor fibers. A plurality of precursor fibers 92 having a core and shell configuration is thus formed and ejected from the spinneret 66. The precursor fibers 92 pass through a spin finish device 94 and can pass through a take-off roller 96, followed by secondary rollers 98, and finally to a winder roller 100 where the precursor fibers 150 are collected, for example, on a creel.

Notably, after ejecting the polymer precursor materials from a nozzle or a spinneret 66, other processes may be performed using traditional manufacturing techniques that are well known in the art for spinning acrylic PAN-based polymer precursors. For example, while not shown, the spinning process may include forming the precursor fibers in a spinning bath. The precursor fibers may then be conveyed to a second washing bath to wash the fibers from impurities and then the precursor fibers may pass through a drawing bath. The fibers may be stretched in such a drawing bath. The precursor fibers may then be dried. The carbon fiber precursor may be stretched to spread flat. The carbon fiber precursor may then be wound on a winder or creel for transport to a manufacturing facility for forming carbon fibers from the precursor fibers.

Prior to heat treating to begin the process of forming the carbon fiber, the precursor may be spread flat to form a tow band for a warp sheet. The precursor fibers may be subjected to an initial thermal stabilization (e.g., oxidation) process to obtain high quality carbon fibers. Such an initial thermal stabilization step is typically conducted by heating the precursor fibers at a controlled relatively low-temperature, for example, 200-300° C. in air to convert to a form that can be further heat-treated without either melting or fusion of the fibers. The linear PAN-based polymer precursor is typically at least partially converted to cyclic structures during this initial thermal stabilization step.

Thus, the stretched carbon fiber precursors may then be passed through an oxidation oven, during which, oxygen from the air combines with the carbon fiber precursor to form cross-linked polymer chains. The temperature and airflow in the oxidation oven is modified to supplement the composition of the carbon fiber precursor.

Next, the thermally stabilized fibers may be subjected to one or more heating steps that perform carbonization and graphitization. These steps are typically conducted in an oven or furnace with an inert atmosphere. While temperatures may vary, carbonization is typically performed at temperatures of at least 1,500-1,600° C. An additional heat treatment step may also be conducted for graphitization. Graphitization typically occurs by heating the precursor fiber to a temperature in a range of greater than or to about 1,600° C.-3,000° C. Graphitization provides a high modulus in the carbon fiber formed. Thus, a two-step heating process may be conducted to form the carbon fiber, first a relatively low temperature carbonization process and then followed by a high-temperature graphitization process, depending on the final carbon fiber properties that are required.

Therefore, after passing through the oxidation oven for thermal stabilization, the carbon fiber precursor may be passed through one or more carbonization ovens or furnaces. Stretching continues as the carbon fiber precursor passes through the carbonization oven(s). Within each carbonization oven is an inert (e.g., oxygen-free) atmosphere. The temperature of the carbonization oven(s) progressively increases causing non-carbon molecules to particulate in the absence of oxygen. The particulate is then exhausted from the oven. The number of carbonization ovens through which the carbon fiber precursor is passed may depend on the grade of carbon fiber being manufactured. The carbon fiber may then enter an optional graphitization furnace for additional heat treatment. After the carbon fiber has been heated, it may be surface heated, sized, and spooled for later processing and use (e.g., incorporation into pre-preg or composite materials).

In certain aspects, the present disclosure provides methods of producing a continuous carbon fiber for use in composites having enhanced moldability. The method comprises incorporating a plurality of discrete regions into a core of a continuous precursor fiber having a core and sheath configuration. The sheath and regions of the core may comprise an acrylic polymer material. The discrete regions in the core are predetermined regions or domains that will become the weak regions within the carbon fiber eventually formed. Thus, the continuous precursor fiber is processed to form a continuous carbon fiber having a plurality of discrete weak regions corresponding to the plurality of discrete regions after it is heated for carbonization and graphitization.

Figure 4:
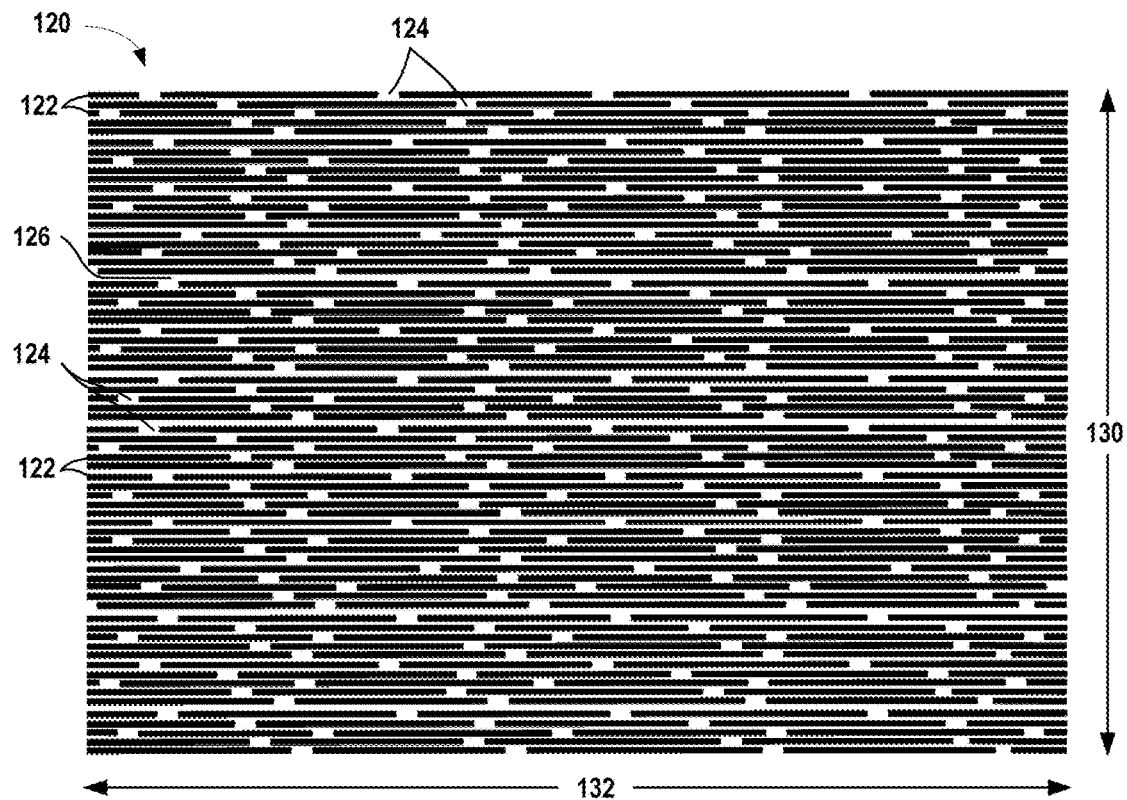
FIG. 4 is a schematic of a polymeric composite having a plurality of continuous carbon fiber filaments prepared in accordance with certain aspects of the present disclosure. Each respective carbon fiber filament core region has a plurality of discrete, noncontiguous, relatively weak regions or break points interspersed therein.

In FIG. 4, a carbon-fiber reinforced polymeric composite 120 prepared in accordance with certain aspects of the present disclosure is provided. The composite 120 has a plurality of continuous carbon fibers 122 and a polymeric matrix 126 distributed within and around the carbon fibers 122. The continuous carbon fibers 122 have a plurality of weak regions 124 distributed at regular intervals along each continuous carbon fiber 122. The plurality of weak regions 124 is staggered throughout the continuous carbon fibers 122 across a width 130 of the composite 120. Thus, the locations of the weak regions 124 differ along a length 132 of each continuous carbon fiber 122 with respect to adjacent carbon fibers 122. In this manner, the continuous carbon fibers 122 are capable of breaking at the weak regions 124 when bent, folded, or otherwise stressed, while not permitting stress and fracture propagation across the width 130 or length 132 of the composite 120. Furthermore, the presence of the sheath around the core containing the weak regions 124 helps to enhance strength of the overall carbon fiber during processing and manufacture, but introduces enough weakness within the core to facilitate breakage during molding of to form a composite with the continuous carbon fibers. This maintains the strength of the composite 120 ultimately formed to near the strength levels provided by conventional continuous carbon fibers, but also provides lower stiffness and greater flexibility (with a lower modulus of elasticity) for during subsequent molding processes.

In certain aspects, a plurality of continuous carbon fibers (e.g., a bundle of carbon fiber filaments) is contemplated by the present disclosure where each has a plurality of discrete weak regions. A first continuous carbon fiber has a first plurality of discrete weak regions and a second continuous carbon fiber adjacent to the first continuous carbon fiber has a second plurality of discrete weak regions. The first plurality of discrete weak regions is staggered with respect to the second plurality of discrete weak regions when the first continuous carbon fiber and the second continuous carbon fiber are aligned lengthwise.

FIG. 5 further exemplifies this concept, showing a detailed section of a partial view of a bundle 140 having a plurality of continuous carbon filaments or fibers 142. Each carbon fiber includes a plurality of discrete weak regions 144 formed in a central region 146 (corresponding to the core) along a body 148 of each fiber 142. Notably, the body 148 surrounds the discrete weak regions 144 in the central region 146. A first carbon fiber 150 has a plurality of first discrete weak regions 152 interspersed within a central region 154 of body 156. The body 156 has a relatively higher strength as compared to the first discrete weak regions 152. Each discrete weak region 152 is disposed within the central region 154 along the body 156 at regular intervals (e.g., having the same distance between respective weak regions 152). A second carbon fiber 160 is adjacent to the first carbon fiber 150. The second carbon fiber 160 has a plurality of second discrete weak regions 162 interspersed along a length of a body 164 and in a central region 166 of the body 164 at regular intervals. A third carbon fiber 170 is adjacent to the second carbon fiber 160. The third carbon fiber 170 has a plurality of third discrete weak regions 172 interspersed along a length of a body 174 at regular intervals. As can be seen, the plurality of first discrete weak regions 152 is offset from the second discrete weak regions 162 in the adjacent carbon fiber by a first distance 180. The plurality of second discrete weak regions 162 are likewise offset from the third discrete weak regions 172 in the adjacent third carbon fiber 170 by a second distance 182. In this manner, the plurality of first discrete weak regions 152, the plurality of second discrete weak regions 162, and the plurality of the third discrete weak regions 172 are staggered and offset with respect to both a width 184 and a length 186 of the bundle 140.

As such, while there are break points intentionally introduced into the carbon fibers 142 of the bundles, where the weak regions are noncontiguous and dispersed throughout the central region of high strength body 148 of each fiber. This design provides a greater ability to conform and be molded, while minimizing fracture and crack propagation, thus retaining the ultrahigh strengths associated with continuous carbon fibers. It should be noted that the plurality of weak regions may be spaced at shorter or longer distances from one another and may be spaced differently in distinct continuous carbon fiber/filaments of the bundle. Further, in alternative variations, the spacing between the weak regions may not be uniform between different regions and in certain aspects, may be randomly spaced. Notably, the longer the distance between the weak regions of the continuous carbon fiber, the higher the stiffness and strength of the composite formed with such the continuous carbon fibers. Where greater moldability and flexibility is required for the composite, the distance between the weak regions of the continuous carbon fiber may be shorter. This provides a greater number of break points (higher breakpoint density) within the continuous carbon fibers that will provide a composite with less stiffness, but with some diminished strength as well. The continuous carbon fiber having a core and sheath provides a tougher carbon fiber, For instance, the sheath material and main core material may be chosen to be a PAN, which when carbonized, will have an elongation at break of 2 to 4%, whereas the weak regions within the core may be chosen of a PAN, which when carbonized, will have a higher modulus than the sheath/primary material of the core with an elongation of break of 1 to 2%.

In certain aspects, each respective weak region in the core is spaced apart from an adjacent weak region in the core of the continuous carbon fiber by a distance of greater than or equal to about 0.1 inches (about 2.5 mm) to less than or equal to about 12 inches (about 30.5 cm). In certain other aspects, a suitable range is greater than or equal to about 3 inches (about 7.6 cm) to less than or equal to about 6 inches (about 15.2 cm).

In certain aspects, each respective weak region formed in the core of the continuous carbon fiber provides a weak point capable of breaking during molding, so a length of the weak region in the fiber is of less importance than the length between weak regions. However, in certain variations, a weak region may have a length of less than or equal to about 0.01 inches (about 254 µm). In certain aspects, each weak region has a length of greater than or equal to about 0.10 inches (about 2.5 mm) to less than or equal to about 1.0 inch (25.4 mm).

In other aspects, a suitable average thickness of a wall of the sheath may be greater than or equal to about 0.5 µm to less than or equal to about 3 µm. A suitable average core diameter may be greater than or equal to about 1 µm to less than or equal to about 7 µm. A ratio of second polymer material to third polymer material in the core of the precursor fiber may range from greater than or equal to about 2 (so that for 2 mm of second polymer, the core has about 1 mm of the third polymer) to less than or equal to about 300, optionally greater than or equal to about 10 to less than or equal to about 100 in other variations. The lower the ratio and greater the amount of the third polymer present in the core, the greater the brittleness and breakability of the carbon fiber ultimately formed after thermal treatment, carbonization, and graphitization.

In various aspects, the methods of the present disclosure improve moldability of carbon fiber composites, by introducing heterogeneity in the fibers at the filament level to create breaking points combined with a sheath or shell layer to better enable processing. In this manner, carbon fibers prepared in accordance with certain aspects of the present disclosure are structurally intact for a molding process to form a complex three-dimensional component, but can be shaped and follow the contours of the mold surface during the molding process. Composites formed from such modified carbon fibers have improved surface quality by avoiding fiber distortion around curvatures in the mold, while there is minimal or no loss of mechanical properties.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of producing a continuous carbon fiber for use in composites having enhanced moldability, the method comprising:

forming a continuous precursor fiber comprising a sheath and a core, the forming comprising, forming the sheath by extruding a first polymer material in a first extruder, the sheath having an average wall thickness of greater than or equal to about 0.5 μm to less than or equal to about 3 μm, and forming the core by co-extruding a second polymer material and a third polymer material in a second extruder, the co-extruding comprising intermittently feeding the second polymer material and the third polymer material into a chamber of the second extruder, wherein the sheath comprises the first polymer material and the core comprises the second polymer material and a plurality of discrete regions distributed within the second polymer material along a length of the continuous precursor fiber, wherein the plurality of discrete regions comprises the third polymer material, wherein after the continuous precursor fiber is heated for carbonization and graphitization, the continuous precursor fiber forms a continuous carbon fiber having a plurality of discrete weak regions corresponding to the plurality of discrete regions in the core, wherein the continuous carbon fiber remains substantially intact until a molding process to form a carbon fiber composite.

2. The method of claim 1, wherein after the extruding and co-extruding, the method further comprises introducing the first polymer material, the second polymer material, and the third polymer material through a nozzle or spinneret to form the continuous precursor fiber comprising the sheath and the core.

3. The method of claim 1, wherein the third polymer material is selected from the group consisting of: lignin, polyethylene, polystyrene, polyacrylonitrile (PAN), polymers comprising submicron filler particles, and combinations thereof.

4. The method of claim 1, wherein the first polymer material and the second polymer material have the same composition.

5. The method of claim 1, wherein the first polymer material and the second polymer material are an acrylic copolymer formed from an acrylonitrile monomer and a second monomer selected from the group consisting of: acrylic acid, itaconic acid, methacrylic acid, vinyl esters, vinyl amides, vinyl halides, salts of vinyl compounds, salts of sulfonic acids, and combinations thereof.

6. The method of claim 1, wherein the plurality of discrete weak regions has a first ultimate tensile strength that is at least 50% less than a second ultimate tensile strength of a remainder of the continuous carbon fiber.

7. The method of claim 1, wherein a ratio of second polymer material to third polymer material in the core of the continuous precursor fiber ranges from greater than or equal to about 2 to less than or equal to about 300.

8. The method of claim 1, wherein each respective discrete weak region of the plurality of discrete weak regions has a length of less than or equal to about 2 inches.

9. The method of claim 1, wherein each respective discrete weak region of the plurality of discrete weak regions is spaced apart from an adjacent weak region in the core of the continuous carbon fiber by a distance of greater than or equal to about 0.1 inches to less than or equal to about 12 inches.

10. The method of claim 1, wherein the core has an average diameter of greater than or equal to about 1 μm to less than or equal to about 7 μm.

11. A method of producing a bundle of continuous carbon fibers for use in composites having enhanced moldability, the method comprising:

forming a plurality of continuous precursor fibers each comprising a sheath and a core, the forming comprising, forming the sheath by extruding a first polymer material in a first extruder, and forming the core by co-extruding a second polymer material and a third polymer material in a second extruder, the co-extruding comprising intermittently feeding the second polymer material and the third polymer material into a chamber of the second extruder, wherein the sheath comprises the first polymer material and the core comprises the second polymer material and a plurality of discrete regions distributed within the second polymer material along a length of the continuous precursor fiber, wherein the plurality of discrete regions comprises the third polymer material, wherein after the plurality of continuous precursor fibers is heated for carbonization and graphitization, the plurality of continuous precursor fibers forms the bundle of continuous carbon fibers, wherein each fiber has a plurality of discrete weak regions corresponding to the plurality of discrete regions in the core and the bundle of continuous carbon fibers remain substantially intact until a molding process to form a carbon fiber composite.

12. The method of claim 11, wherein the plurality of continuous precursor fibers comprises a first continuous carbon fiber having a first plurality of discrete weak regions in a first core and an adjacent second continuous carbon fiber having a second plurality of discrete weak regions in a second core, wherein the first plurality of discrete weak regions is staggered with respect to the second plurality of discrete weak regions when the first continuous carbon fiber and the adjacent second continuous carbon fiber are aligned lengthwise.

13. The method of claim 11, further comprising heating the plurality of continuous precursor fibers to a temperature of greater than or equal to about 1,500° C. for carbonization and/or graphitization.

14. The method of claim 13, further comprising heating the plurality of continuous precursor fibers to a temperature of greater than or equal to about 200° C. to less than or equal to about 300° C. for thermal stabilization prior to the heating for carbonization and/or graphitization.

* * * * *